US012811036B2

(12) United States Patent
Higashi et al.

(10) Patent No.: US 12,811,036 B2
(45) Date of Patent: Nov. 24, 2026

(54) SURGE-ABSORBING ELEMENT

(71) Applicant: Panasonic Intellectual Property Management Co., Ltd., Osaka (JP)

(72) Inventors: Yoshiko Higashi, Osaka (JP); Eiichi Koga, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 438 days.

(21) Appl. No.: 18/570,016

(22) PCT Filed: Jun. 28, 2022

(86) PCT No.: PCT/JP2022/025785
§ 371 (c)(1),
(2) Date: Dec. 13, 2023

(87) PCT Pub. No.: WO2023/277021
PCT Pub. Date: Jan. 5, 2023

(65) Prior Publication Data

US 2024/0274331 A1 Aug. 15, 2024

(30) Foreign Application Priority Data

Jul. 1, 2021 (JP) ................................ 2021-109797

(51) Int. Cl.
*H01C 7/12* (2006.01)
*H01C 7/18* (2006.01)

(52) U.S. Cl.
CPC ................ *H01C 7/12* (2013.01); *H01C 7/18* (2013.01)

(58) Field of Classification Search
CPC .................................. H01C 7/12; H01C 7/18
See application file for complete search history.

(56) References Cited

U.S. PATENT DOCUMENTS 6,087,923 A 7/2000 Ahn et al.
8,217,751 B2 * 7/2012 Tan .................... H01C 7/1006 338/21

(Continued)

FOREIGN PATENT DOCUMENTS

JP H11-003809 A 1/1999
JP 2012-169334 A 9/2012

(Continued)

OTHER PUBLICATIONS

International Search Report received in International Application No. PCT/JP2022/025785, dated Oct. 4, 2022.

*Primary Examiner* — Kyung S Lee
(74) *Attorney, Agent, or Firm* — Rimon P.C.

(57) ABSTRACT

A surge-absorbing element includes: an element body having a pair of end surfaces opposite to each other and a plurality of side surfaces; at least one pair of internal electrodes; and at least one pair of external electrodes disposed on the pair of end surfaces. The element body includes a functioning portion having voids and including polycrystal structures including a plurality of crystal particles which exhibit voltage non-linearity characteristics and an outer shell part covering the functioning portion. The internal electrodes face each other via the functioning portion. The external electrodes include at least one pair of primary external electrodes disposed on the end surfaces and at least one pair of secondary external electrodes disposed on, and electrically connected to, the primary external electrodes. Each of the secondary external electrodes has an elastic modulus lower than an elastic modulus of each of the primary external electrodes.

14 Claims, 6 Drawing Sheets

(56) References Cited

U.S. PATENT DOCUMENTS

| | | | | |
|---|---|---|---|---|
| 8,400,254 | B2 * | 3/2013 | Koga | H01C 7/1006 338/21 |
| 8,471,672 | B2 * | 6/2013 | Feichtinger | H01G 4/30 338/21 |
| 2005/0276001 | A1 * | 12/2005 | Matsuoka | H01C 7/18 361/306.3 |
| 2011/0304946 | A1 * | 12/2011 | Koga | H01C 7/1006 361/118 |
| 2023/0245806 | A1 * | 8/2023 | Mutou | C04B 35/453 338/21 |

FOREIGN PATENT DOCUMENTS

| | | | |
|---|---|---|---|
| WO | 2010/122732 | A1 | 10/2010 |
| WO | 2012/114925 | A1 | 8/2012 |

* cited by examiner

SURGE-ABSORBING ELEMENT

CROSS-REFERENCE TO RELATED APPLICATIONS

This application is the U.S. National Phase under 35 U.S.C. § 371 of International Application No. PCT/JP2022/025785, filed on Jun. 28, 2022, which claims the benefit of foreign priority to Japanese Patent Application No. 2021-109797 filed on Jul. 1, 2021, the entire contents of each of which are hereby incorporated by reference.

TECHNICAL FIELD

The present disclosure relates to surge-absorbing elements and specifically relates to a surge-absorbing element including a functioning portion which exhibits voltage non-linearity characteristics.

BACKGROUND ART

Semiconductor devices such as ICs and LSIs destruct, or degrade their performances, due to electrostatic discharge (hereinafter referred to as ESD). Recent semiconductor devices have miniaturized wiring patterns of ICs along with an increasing speed of their operation and are thus more vulnerable to the ESD. Moreover, the speed of communication will certainly further increase, and therefore, there are growing demands for countermeasures against abnormal voltages, typically, the ESD, across high-speed transmission lines. A general countermeasure against the ESD is to connect a surge-absorbing element between an input/output terminal line of a semiconductor device and ground. The surge-absorbing element causes a high voltage (hereinafter referred to as an ESD voltage) surge due to electrostatic discharge to bypass the semiconductor device, thereby protecting the semiconductor device. As the surge-absorbing element, a multilayer varistor is widely used. In general, the multilayer varistor includes a ceramic layer, a pair of internal electrodes, a ceramic insulator, and external electrodes. For the ceramic insulator, a composition the same as that for the ceramic layer may be used. The ceramic layer having varistor characteristics includes ZnO as its main component. The internal electrodes face each other via the ceramic layer disposed between the internal electrodes, thereby constituting a varistor functioning portion. The external electrodes are drawn from both ends of the ceramic insulator and are electrically connected to the respective internal electrodes. Such a surge-absorbing element is disclosed in Patent Literature 1.

When a conventional multilayer varistor is used in a high-speed signal line, an electrostatic capacitance component attributed to a ceramic layer and a ceramic insulator causes, for example, waveform deformation of a high-speed signal. Therefore, the electrostatic capacitance of a multilayer varistor used as the countermeasure against the ESD in a high-speed transmission circuit has to be very low. A capacitance reducing method based on design is to reduce an overlap between internal electrodes and to reduce an electrode area. However, as the electrode area decreases, a current density at the time of application of a high voltage surge increases, thereby increasing a load, and therefore, degradation of varistor characteristics or destruction occurs, which reduces tolerance against the ESD. A suppressed voltage which is a voltage after a surge voltage is suppressed by the multilayer varistor has to be increased as well, thereby reducing a protective effect. Thus, there is a demand for a countermeasure device having low electrostatic capacitance, high protective performance, and high tolerance which the conventional surge-absorbing element cannot have. To meet such a demand, a functioning portion having voids and having voltage non-linearity is formed between the internal electrodes facing each other, and a surface discharge is caused at surfaces, exposed in the voids, of a plurality of crystal particles, thereby achieving the low electrostatic capacitance and a high suppressing effect. Moreover, unlike a conventional plane gap electrode method, no electrode wear occurs at the time of ESD application, and therefore, the suppressed voltage does not increase. Such a surge-absorbing element is disclosed in Patent Literature 2.

Examples of a technology relating to a conventional varistor are Patent Literature 1 and Patent Literature 2.

Element design of providing voids in an element as disclosed in Patent Literature 2, however, readily destabilizes the suppressing effect, tolerance against the ESD and/or a DC voltage. At the time of ESD suppression, a current of greater than or equal to 30 A instantaneously flows. An expansion of the internal electrodes and a thermal shock to the external electrode and/or ceramics along with heat generation cause problems, such as a fracture from a location between the internal electrodes and a peeling off of the external electrodes, which are specific to a porous inner structure. Moreover, the element is susceptible to an external force at the time of ESD application, which leads to a variation in the electrical characteristics of the element.

CITATION LIST

Patent Literature

Patent Literature 1: JP H11-3809 A
Patent Literature 2: WO 2010/122732 A1

SUMMARY OF INVENTION

It is an object of the present disclosure to provide a surge-absorbing element configured to provide a good and stable ESD suppressing effect and having tolerance against an abnormality voltage or a DC voltage.

A surge-absorbing element according to an aspect of the present disclosure includes an element body having a pair of end surfaces opposite to each other and a plurality of side surfaces each adjacent to the pair of end surfaces; at least one pair of internal electrodes disposed in the element body; and at least one pair of external electrodes each disposed on a corresponding one of the pair of end surfaces and electrically connected to a corresponding one of the internal electrodes. The element body includes a functioning portion having voids and including polycrystal structures including a plurality of crystal particles which exhibit voltage non-linearity characteristics and an outer shell part covering the functioning portion. The internal electrodes face each other via the functioning portion disposed between the internal electrodes. The external electrodes includes at least one pair of primary external electrodes disposed on the end surfaces and at least one pair of secondary external electrodes disposed on the primary external electrodes and electrically connected to the primary external electrodes. Each of the secondary external electrodes has an elastic modulus lower than an elastic modulus of each of the primary external electrodes.

DESCRIPTION OF EMBODIMENTS

1. Overview

A surge-absorbing element of an embodiment of the present disclosure will be described below with reference to the drawings. Note that figures to be referred to in the following description of embodiments are schematic representations. Thus, the sizes, thicknesses, and other attributes of the respective constituent elements illustrated on those drawings are not always to scale, compared with actual ones.

To solve the problems mentioned above, the inventors intensively studied each of components of a surge-absorbing element and found that in a surge-absorbing element including primary external electrodes and secondary external electrodes as external electrodes, relief of internal stress relates to, for example, a decrease in an ESD suppressing effect and tolerance against an abnormality voltage or the like, and thereby, the inventors accomplished the present disclosure.

Figure 1:
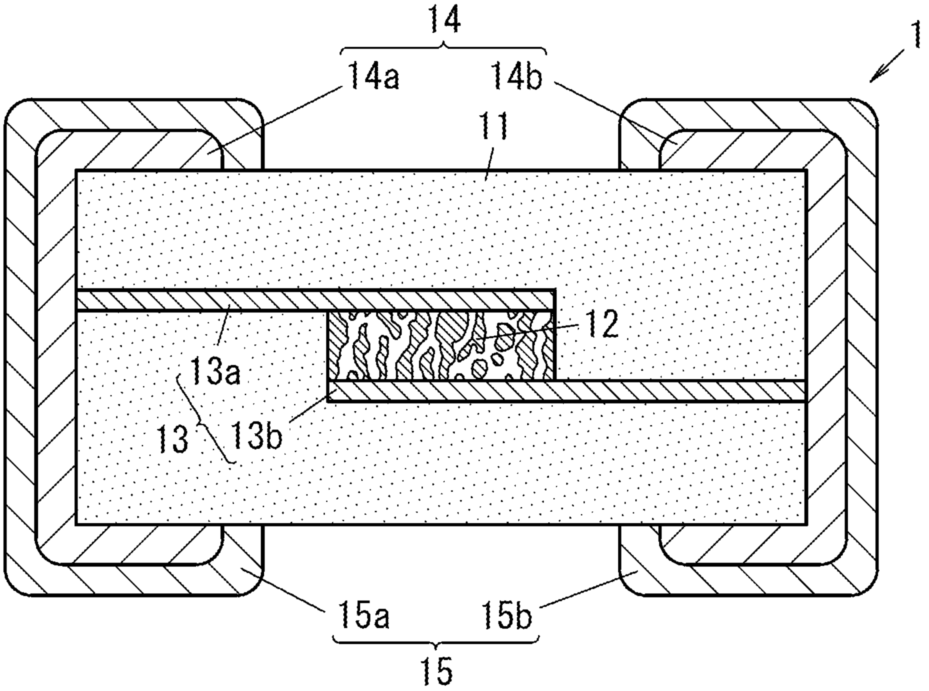
FIG. 1 is a sectional view of a surge-absorbing element of an embodiment of the present disclosure.

As shown in FIG. 1, a surge-absorbing element 1 according to the present embodiment includes an element body 11, at least one pair of internal electrodes 13 disposed in the element body 11, and at least one pair of external electrodes each disposed on a corresponding one of a pair of end surfaces of the element body 11 and electrically connected to a corresponding one of the internal electrodes 13. The element body 11 includes a functioning portion 12 and an outer shell part covering the functioning portion 12. The at least one pair of external electrodes include: at least one pair of primary external electrodes 14 each disposed on a corresponding one of the end surfaces of the element body 11; and at least one pair of secondary external electrodes 15 disposed on the primary external electrodes 14 and electrically connected to the primary external electrodes 14. The at least one pair of internal electrodes 13 face each other via the functioning portion 12 disposed between the at least one pair of internal electrodes 13. The surge-absorbing element 1 has a feature that each of the secondary external electrodes 15 has an elastic modulus lower than an elastic modulus of each of the primary external electrodes 14.

The configuration described above enables the surge-absorbing element 1 to provide a good and stable ESD suppressing effect and have tolerance against an abnormality voltage or a DC voltage. The reason why the surge-absorbing element 1 of the present embodiment having the configuration described above provides the effect is not necessarily clear but is presumably, for example, as follows. In a conventional surge-absorbing element, a reduction in, or destabilization of, the ESD suppressing effect and a reduction in tolerance against an abnormality voltage or a DC voltage occur presumably because the influence of the internal stress which the surge-absorbing element has is manifested by a thermal shock due to heat generation in response to application of a large current at the time of ESD suppression. In the surge-absorbing element 1 of the present embodiment, the elastic modulus of each of the secondary external electrodes 15 is made lower than the elastic modulus of each of the primary external electrodes 14 to readily relieve the internal stress, thereby maintaining the good and stable ESD suppressing effect and the tolerance against the abnormality voltage or the DC voltage.

2. Details

Surge-Absorbing Element

The surge-absorbing element 1 of the present embodiment includes the element body 11, the internal electrodes 13, the primary external electrodes 14, and the secondary external electrodes 15.

At least a pair of internal electrodes 13, at least a pair of primary external electrodes 14, and at least a pair of secondary external electrodes 15 are provided. The surge-absorbing element 1 in each of FIG. 1 and FIGS. 4 to 6 includes two (a pair of) internal electrodes 13, two (a pair of) primary external electrodes 14, and two (a pair of) secondary external electrodes 15. That is, the internal electrodes 13 include a first internal electrode 13*a* and a second internal electrode 13*b*. The primary external electrodes 14 include a first primary external electrode 14*a* and a second primary external electrode 14*b*. The secondary external electrodes 15 include a first secondary external electrode 15*a* and a second secondary external electrode 15*b*.

The surge-absorbing element 1 is mounted on a substrate by bonding the first secondary external electrode 15*a* and the second secondary external electrode 15*b* to the substrate by using a bonding material such as solder. When a surge voltage is applied across the first secondary external electrode 15*a* and the second secondary external electrode 15*b* in a state where the surge-absorbing element 1 is mounted on the substrate, a surge current flows between the first internal electrode 13*a* electrically connected to the first secondary external electrode 15*a* and the second internal electrode 13*b* electrically connected to the second secondary external electrode 15*b* via the functioning portion 12. This protects, for example, a semiconductor device including the substrate.

The element body 11 has the pair of end surfaces opposite to each other and a plurality of side surfaces each adjacent to the pair of end surfaces. The element body 11 is, in general, in the shape of, for example, a rectangular parallelepiped having six surfaces, and the "end surfaces" mean two surfaces having small areas and being opposite to each other (a right surface and a left surface in FIG. 1). The other four surfaces each adjacent to the two end surfaces are referred to as the "side surfaces".

FIG. 1 is a sectional view of the surge-absorbing element 1 of the embodiment of the present disclosure. The surge-absorbing element 1 in FIG. 1 includes, in the element body 11 made of ceramic, the first internal electrode 13*a* and the second internal electrode 13*b* disposed to face the first internal electrode 13*a*, and an area between the first internal electrode 13*a* and the second internal electrode 13*b* serves as the functioning portion 12. On both the end surfaces of the element body 11, the first primary external electrode 14*a* and the second primary external electrode 14*b* (collectively referred to as primary external electrodes 14) are disposed, and the first secondary external electrode 15*a* and the second secondary external electrode 15*b* (collectively referred to as secondary external electrodes 15) are respectively disposed on the first primary external electrode 14*a* and the second primary external electrode 14*b*. Each of the first internal electrode 13*a* and the second internal electrode 13*b* is a sheet-shaped thin film having a constant thickness and includes an Ag—Pd alloy. Other than the Ag—Pd alloy, a metal material, such as Pd, Au, Ag, or Pt, is appropriately used. Each of the first internal electrode 13*a* and the second internal electrode 13*b* has a principal surface, and the principal surfaces of the first internal electrode 13*a* and the second internal electrode 13*b* at least partially face each other at a distance, thereby forming facing regions overlapping each other. The first internal electrode 13*a* and the second internal electrode 13*b* are each drawn from the functioning portion 12 toward a corresponding one of the two end surfaces, opposite to each other, of the element body 11 and are respectively electrically connected to the first primary external electrode 14*a* and the second primary external electrode 14*b* at the end surfaces of the element body 11.

The functioning portion 12 is made of a varistor material which is a non-linear resistor composition depending on a voltage. Specifically, the functioning portion 12 is formed of a sintered body including polycrystal structures including a plurality of crystal particles which exhibit voltage non-linearity characteristics. Such crystal particles include, for example, ZnO as a main component. Such a varistor material contains an element(s) such as Sr, Ca, Co, Cr, Mn, Al, etc. as a sub-component(s) in addition to ZnO, and the sub-component(s) has a higher melting point than ZnO. The composition of the varistor material in the present embodiment is 97.5 mol % ZnO and 2.5 mol % sub-component(s) other than ZnO. The thickness of the functioning portion 12 is about 6 μm.

The outer shell part may be made of the same material as the functioning portion 12 or may be made of a material different from the material for the functioning portion 12. That is, the functioning portion 12 may include a main component different from the main component of the outer shell part. Examples of the main component, different from that of the functioning portion 12, of the outer shell part include a sintered body and thermosetting resins such as an epoxy resin and a phenol resin.

When the outer shell part is the sintered body, glass-ceramics may be used as the sintered body. Examples of the glass-ceramics include a material (relative permittivity is about 10) obtained by adding MgO, $SiO_2$, and $Gd_2O_3$ to alumina particles and borosilicic acid glass. When the main component of the outer shell part is the glass-ceramics, including an element having a smaller work-function than the functioning portion 12 in the outer shell part enables discharge at a low voltage, thereby providing a high surge absorbing effect. When the main component of the outer shell part is a resin, the internal stress in the element body 11 can be effectively relieved, so that a fracture and the like of the functioning portion 12 can be prevented. As a resin used for the outer shell part, a resin having high heat resistance is more preferable because a large amount of heat is generated by a flow of a large current at the time of ESD application.

Thus, the surge-absorbing element 1 can exhibit new effects such as a fracture preventing effect and a high surge absorbing effect by making different the main component of the functioning portion 12 and the main component of the outer shell part. In the surge-absorbing element 1, the main component of the functioning portion may include ZnO, and the main component of the outer shell part may include a resin. Alternatively, in the surge-absorbing element 1, the main component of the functioning portion 12 may include ZnO, and the main component of the outer shell part may include the glass-ceramics.

The functioning portion 12 has a porous structure having voids therein, and the polycrystal structures including the plurality of crystal particles has a connected structure in the region between the first internal electrode 13*a* and the second internal electrode 13*b*. In the present embodiment, the functioning portion 12 has a void ratio of about 85%.

Here, the void ratio is obtained by performing a process of subjecting the functioning portion 12 to Ar ion polishing by a cross section polisher (CP) method and then calculating a ratio of area occupied by the voids by observing the polishing cross section, on five cross sections of the element body 11, to obtain ratios of area, and averaging the ratios.

In this configuration, a surface discharge transmitting via a barrier wall of a crystal grain boundary is elicited at surfaces of the varistor material which are bordering the voids in response to ESD voltage application, thereby electrically connecting the first internal electrode 13*a* and the second internal electrode 13*b* to each other.

Each of the primary external electrodes 14 includes a conductive metal. The present embodiment employs Ag as metal powder of a conductive paste. As the conductive metal, at least one selected from Cu, Ni, Pd, an Ag—Pd alloy, Au, and the like may be included. Moreover, as the glass component, at least one selected from B, Si, Zn, Ba, Mg, Al, Li, and the like may be included. Each of the primary external electrodes 14 may include a plurality of layers. Each of the primary external electrodes 14 has a thickness of about 120 μm at the thickest portion thereof. The primary external electrodes 14 are formed by applying the conductive paste to the end surfaces of the element body 11 and then subjecting the conductive paste to heat treatment at about 800° C. The elastic modulus of each primary external electrode 14 used in the present embodiment is about 83 GPa.

In the present embodiment, the secondary external electrodes 15 are formed to externally cover, and are electrically connected to, the respective primary external electrodes 14 and are a material, such as a resin including metal particles and the like dispersed therein, having a low elastic modulus.

Thus, the primary external electrodes 14 may contain no resin, and the secondary external electrodes 15 may contain a resin. In this case, elastic moduli of the primary external electrodes 14 and the secondary external electrodes 15 can be more appropriately controlled.

The secondary external electrodes 15 are formed by applying a thermosetting conductive paste including metal onto the primary external electrodes 14 and curing the thermosetting conductive paste by heat treatment. In the present embodiment, the metal powder contained in the thermosetting conductive paste is 1 to 10 μm Ag powder, and the content percentage of the Ag powder is 70 wt. %. Each secondary external electrode 15 after cured has a resistivity of $4\times10^{-6}$ Ωcm, an elastic modulus of about 8 GPa, and a thickness of about 150 μm at the thickest portion thereof. Thus, the thickness of each secondary external electrode 15 is preferably greater than the thickness of each primary external electrode 14. Each secondary external electrode 15 having a low elastic modulus is made thicker than each of the primary external electrodes 14 having a high elastic modulus, thereby improving the effect of stress relief, and in addition, the reliability can be improved.

The elastic modulus is evaluated in accordance with JIS Z2280 by creating a test specimen from the primary external electrodes 14 and the secondary external electrodes 15 of the surge-absorbing element 1, or by creating a test specimen from a thermosetting conductive paste used for the primary external electrodes 14 and the secondary external electrodes 15 in accordance with a heat treatment condition when the electrodes are formed. Note that elasticity deformation and plastic deformation correlate with each other, and therefore, after the primary external electrodes 14 and the secondary external electrodes 15 are formed, an indenter is forced into the electrodes to form indentations in the same manner as when the Vickers hardness is evaluated, and based on a comparison regarding the size relationship between the indentations, a comparison regarding the relative relationship of softness may made. The secondary external electrodes 15 and the primary external electrodes 14 are configured such that when the indenter is forced into parts in the cross section of the surge-absorbing element 1 with the same force, the indentation is greater in each secondary external electrode 15 than in each primary external electrode 14, thereby providing the effect of stress relief.

In the surge-absorbing element 1 of the present embodiment, the void ratio of the functioning portion 12 is set to, for example, about 85%, and thereby, when a surge voltage is applied across the internal electrodes 13, a surface discharge can be elicited, in the functioning portion 12, at surfaces, exposed in the voids, of a plurality of crystal particles included in the functioning portion 12, thereby electrically connecting the internal electrodes 13 to each other. This further improves the ESD suppressing effect and the tolerance against the abnormality voltage or the like. For this purpose, the void ratio of the functioning portion 12 is desirably higher than or equal to 25% and lower than or equal to 92%. When the void ratio is lower than 25%, the ESD tolerance decreases. When the void ratio is higher than 92%, connecting the polycrystal structures in the functioning portion 12 to each other between the internal electrodes 13 becomes difficult, an electrical connection path is thus difficulty formed by the surface discharge in the functioning portion 12. Further, the void ratio of the functioning portion 12 is more preferably higher than or equal to 55% and lower than or equal to 92% and much more preferably higher than or equal to 64% and lower than or equal to 87%. Setting the void ratio as described above enables the suppressed voltage to be significantly low and enables the tolerance against static electricity to be further increased.

When the void ratio of the functioning portion 12 increases as in this case, however, the expansion of the internal electrodes 13 and a thermal shock of the external electrodes 14 and 15 and/or ceramics along with heat generation at the time of ESD application may lead to, for example, a fracture from a location between the internal electrodes 13 and peeling off of the external electrodes 14 and 15, which may cause degradation of electrical characteristics or destruction.

In contrast, the surge-absorbing element 1 of the present disclosure includes the primary external electrodes 14 on both the end surfaces of the element body 11 and the secondary external electrodes 15 on the primary external electrodes 14, the elastic modulus of each of the primary external electrodes 14 is set to about 83 GPa, and the elastic modulus of each of the secondary external electrodes 15 is set to about 8 GPa. As described above, setting the elastic modulus of each of the secondary external electrodes 15 to be significantly smaller than the elastic modulus of each of the primary external electrodes 14 can provide the surge-absorbing element 1 having excellent electrical performance and excellent reliability.

When the elastic modulus of each of the primary external electrodes 14 is denoted by $E_A$ and the elastic modulus of each of the secondary external electrodes 15 is denoted by $E_B$, a thermosetting conductive paste having an elastic modulus satisfying the condition $E_A/E_B \geq 3$ after curing is desirably used as a secondary external electrode material. This is because even a thermal shock along with heat generation at the time of ESD application varies the characteristics and/or damages the element, and stress relief is thus more important than crack prevention at the time of solder mounting as compared with a conventional multilayer ceramic element. Moreover, in the surge-absorbing element 1 as explained in the present embodiment, a large current is applied at the time of ESD suppression, and due to a thermal shock due to heat generation, the influence of the internal stress is manifested, and therefore, forming the secondary external electrodes 15 each having a further reduced elastic modulus is important. Moreover, when a change in outdoor air temperature is large, or when the ESD voltage is high (e.g., 20 kV or higher) and a high temperature is caused at the time of ESD application, the influence of the internal stress is more manifested, and therefore, $E_A/E_B \geq 10$ is more desirable. The coefficient of linear thermal expansion has temperature dependency and thus changes also depending on the outdoor air temperature. For example, when an environment temperature changes by 10° C., Ag changes by 0.189 mm per 1 m of one side of a material. In contrast, ceramics generally has a small coefficient of linear thermal expansion, and the coefficient of linear thermal expansion of the ceramics is typically a value of about 0.05 mm (in the case of silicon carbide, 0.044 mm). As explained above, operation under a high temperature more easily causes internal stress, and therefore, a material having a further reduced elastic modulus is preferably selected for the secondary external electrodes 15. However, when the secondary external electrodes 15 are extremely soft, vibration resistance and/or mechanical strength decreases, and therefore, $E_A/E_B \leq 2000$ is desirable. Thus, $3 \leq E_A/E_B \leq 2000$ is preferable, and $10 \leq E_A/E_B \leq 2000$ is more preferable. Moreover, each of the primary external electrodes 14 and the secondary external electrodes 15 may be made of a plurality of materials as long as the elastic modulus of the entire external electrode portion satisfies the relationship described in the present disclosure. To achieve this configuration, the thermosetting conductive paste contains 30 wt. % to 90 wt. % metal powder and 5 wt. % to 70 wt. % thermosetting resin. In order to obtain an effect of absorbing internal stress at the time of static electricity application or external stress at the time of solder mounting, the content of the resin is preferably 25 wt. % to 60 wt. % for formation of the secondary external electrodes 15 each having a low elastic modulus.

Moreover, employing Ag for the primary external electrodes 14 enables electrodes with relatively low-cost metal to be baked in an atmosphere. Moreover, as the internal electrodes 13 at this time, an Ag—Pd alloy is used. The internal electrodes 13 and the primary external electrodes 14 preferably include Ag. This configuration can prevent oxidation at the time of ESD suppression and/or at the time of heat treatment and can provide low resistance electrodes and can thus suppress the suppressing effect from decreasing even in the case of repeated ESD application. The primary external electrodes 14 may be fired at the same time as the element body 11 or may be baked after the element body 11 is fired. Simultaneously sintering the primary external electrodes 14 and the internal electrodes 13 increases fixing strength and provides a burnout preventing effect at the time of a large current inrush. The primary external electrodes 14 may be formed by plating. Moreover, when the ESD is applied, a current of several 10 A instantaneously flows to the surge-absorbing element 1, and therefore, the primary external electrodes 14 desirably have no void and have a high density. This configuration can satisfactorily relieve element internal stress at the time of ESD application.

In addition, the secondary external electrodes 15 desirably include Ag. Thus, the secondary external electrodes 15 are relatively low-cost, are curable in an atmosphere, and have a resistance which can be suppressed from being increased by oxidation at the time of ESD suppression. Moreover, the resistivity of each secondary external electrode 15 after curing is about $4\times10^{-6}$ Ωcm. This configuration can suppress heat from being generated due to a large current of greater than or equal to 10 A flowing to the surge-absorbing element at the time of ESD suppression. The resistivity of each secondary external electrode 15 is preferably less than or equal to $5\times10^{-6}$ Ωcm. Reducing the resistivity of each secondary external electrode 15 enables more current to flow at the time of ESD suppression, thereby providing a high ESD suppressing effect.

Moreover, a relationship between a melting point T1 of the material for the internal electrodes 13 and a melting point T2 of the material for the primary external electrodes 14 is preferably in the relationship that T1>T2. That is, the melting point of each of the internal electrodes 13 is preferably higher than the melting point of each of the primary external electrodes 14. An elastic modulus is a temperature-dependent constant and thus decreases along with heat generation due to a large current inrush. The decreasing rate well corresponds to the melting point of each material. With this configuration, the internal stress at the time of the large current inrush is absorbed, via the internal electrodes 13, by the primary external electrodes 14 each having a low elastic modulus and then by the secondary external electrodes 15, thereby preventing the element from being damaged.

In the present embodiment, employing an Ag—Pd alloy having a higher melting point than Ag also provides an effect of preventing melting by heat generation at the time of ESD suppression. To prevent particularly thermal damage, a material having a high melting point is selected in many cases for the internal electrodes 13 directly in contact with the functioning portion 12. For example, when Ag—Pd is selected for the internal electrodes 13, the primary external electrodes 14 are preferably Ag or a combination of Ag—Pd having a lower Pd content percentage than the internal electrodes 13. Moreover, when Pt is selected for the internal electrodes 13, the primary external electrodes 14 are preferably Cu or, for example, a combination of Ag—Pd.

Note that the metal particles included in the primary external electrodes 14 and the secondary external electrodes 15 may have any shape, such as a spherical shape, a scale shape, or a pin shape. Moreover, the particle size of the metal particles is not particularly limited. For example, a metal particle having a small size is sintered at a low temperature, thereby providing an effect of improving the electric conductivity, and therefore, the particle size and shape are accordingly selected in consideration of the influence of thermal history over process design and electrical characteristics. Moreover, depending on the shape of the metal particles, a process of particle orientation may be performed by, for example, magnetic field application to reduce the resistance of the secondary external electrodes 15.

Moreover, a resin employed for the thermosetting conductor paste at least functions as a fastening binder, and in addition, depending on a manufacturing process to be employed, appropriate printing properties, coating properties, and the like are selected. The resin employed for the thermosetting conductor paste includes, for example, a thermosetting resin. Examples of the thermosetting resin include: (i) amino resins such as a urea resin, a Melamine resin, and a guanamine resin; (ii) epoxy resins such as a bisphenol A-type epoxy resin, a bisphenol F-type epoxy resin, a phenol novolac epoxy resin, and an alicyclic epoxy resin; (iii) an oxetane resin; (iv) phenol resins such as a resol phenolic resin and a novolac phenolic resin; and (v) silicone-modified organic resins such as silicone epoxy and silicone polyester. As the resin, only one type of these materials may be used, or two or more types of these materials may be used in combination.

When the nominal outer shape dimension of the surge-absorbing element 1 is less than or equal to length 2.0 mm×width 1.25 mm×height 1.25 mm and is of a small and thin-type, setting the distance between the internal electrodes 13 (the thickness of the functioning portions) at the region where the internal electrodes 13 face each other to be in the range from 2 μm to 50 μm enables good surge-absorbing characteristics to be achieved. Moreover, in the present embodiment, the thickness of each of the internal electrodes 13 is about 6 μm. The thickness of each internal electrode 13 is preferably greater than or equal to 5 μm. Such a thickness can prevent the internal electrodes from being burned down by an electrical discharge and can improve the tolerance against static electricity. However, an increase in the electrode thickness conventionally increases the internal stress along with thermal expansion of the internal electrodes 13 at the time of static electricity application and thus fractures or destructs the element, and therefore, the thickness of each internal electrode 13 is limited to 5 μm. As in the present embodiment, forming the secondary external electrodes 15 to relieve the internal stress enables the thickness of the internal electrodes 13 to be increased to 5 μm or greater and thus improves the tolerance against the static electricity.

Figure 2:
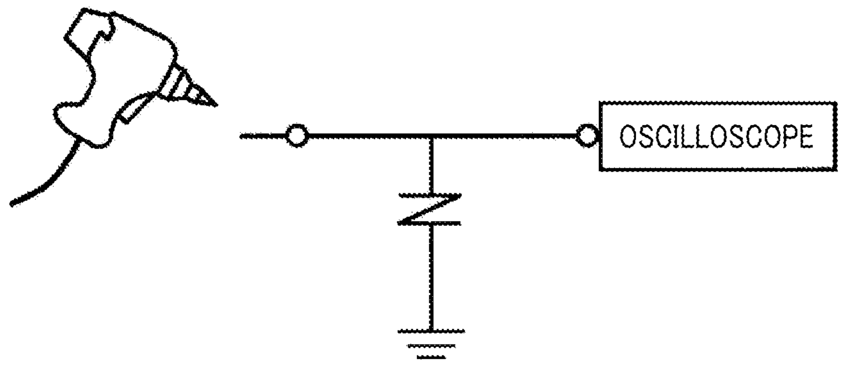
FIG. 2 is a schematic diagram of a method for measuring a suppressed voltage.

Here, a method of evaluating the surge-absorbing element 1 in the present embodiment will be described. A static electricity test is conducted based on an electrostatic discharge immunity test conforming to IEC61000-4-2 and by using a measurement device shown in FIG. 2. In the measurement device of FIG. 2, the surge-absorbing element 1, which is an evaluation sample placed on an evaluation substrate, is connected between a line and GND. Then, an electrical discharge gun connected to a static electricity simulator outputs a static electricity pulse having a prescribed ESD voltage to a line upstream of the surge-absorbing element. When the surge-absorbing element operates, the static electricity pulse is diverted to the GND, and as a result, a pulse component in a line downstream of the surge-absorbing element 1 is reduced. To evaluate the suppressed voltage, a pulse waveform downstream of the surge-absorbing element 1 is observed by using an oscilloscope, and a peak voltage value of the pulse waveform is set to a suppressed voltage. The static electricity simulator has a charging capacity of 150 pF and a discharge resistance of 330Ω, and the observation is made by using a 50Ω-type oscilloscope. In an ESD repetition test, ESD voltage application conforming to the electrostatic discharge immunity test described above is repeatedly performed.

Figure 3A:
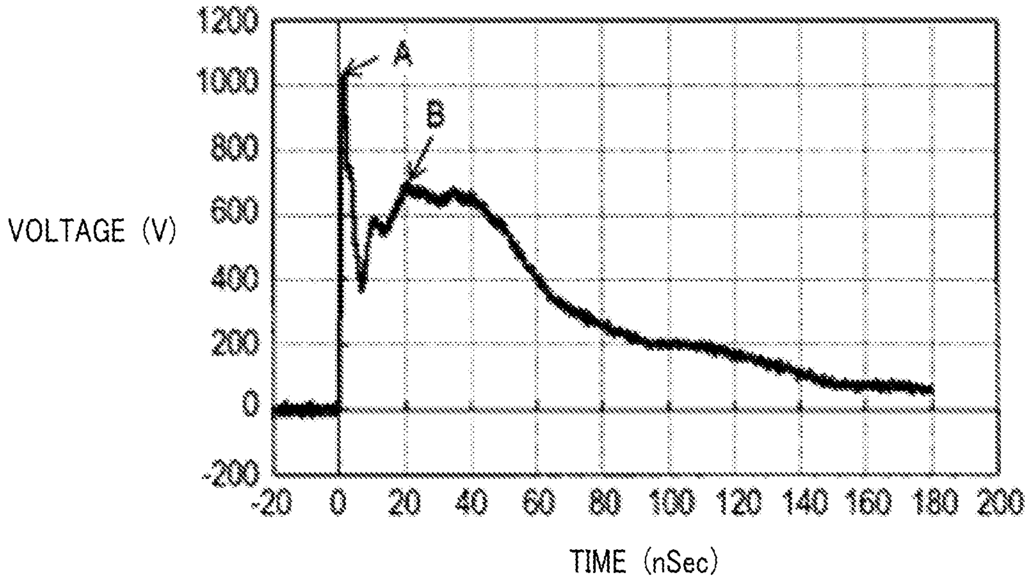
FIG. 3(A) is a pulse waveform diagram in an electrostatic discharge immunity test without the surge-absorbing element.
Figure 3B:
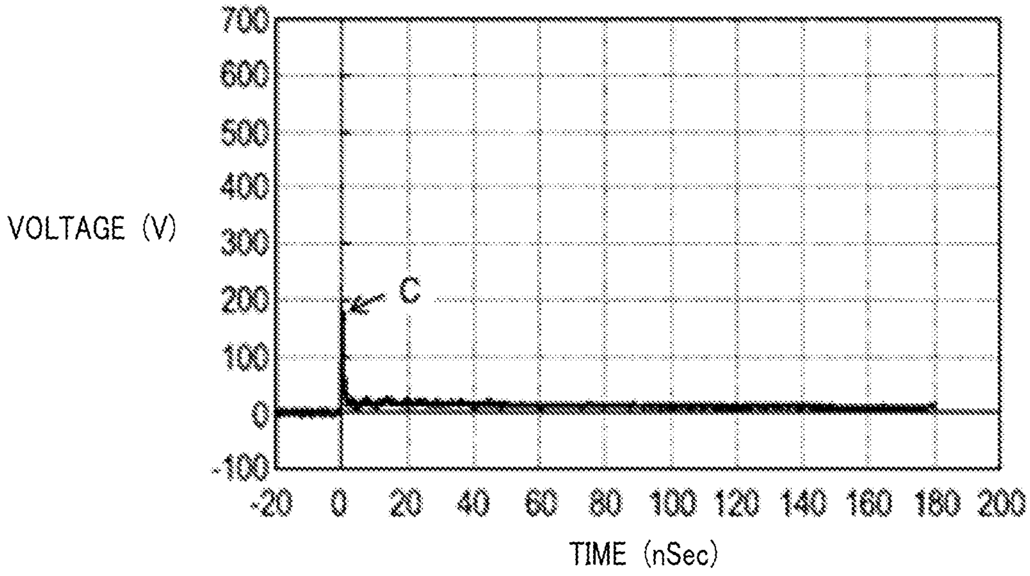
FIG. 3(B) is a pulse waveform diagram in an electrostatic discharge immunity test with the surge-absorbing element of the embodiment of the present disclosure.

FIGS. 3(A) and 3(B) show pulse waveform diagrams observed by using the oscilloscope in an electrostatic discharge immunity test at an ESD voltage of 8 kV. The abscissa represents time (n sec), and the ordinate represents the voltage (V). FIG. 3(A) is a pulse waveform diagram when no surge-absorbing element is attached, and FIG. 3(B) is a pulse waveform diagram of the present embodiment. Attaching the surge-absorbing element suppresses the static electricity of greater than or equal to 1 kV to be less than or equal to 200 V. Moreover, in FIG. 3(B), a peak C at a time corresponding to a peak A is only observed, but no peak appears at a time corresponding to a peak B. This shows that at the time of ESD application, a surface discharge occurs at the functioning portion 12, and a short circuit is observed.

In the present embodiment, the ESD voltage is set to 15 kV, a lead wire is in contact with the surge-absorbing element 1, and the ESD voltage is applied 100 times. In the present embodiment, the element neither cracks nor fracturs.

Figure 4:
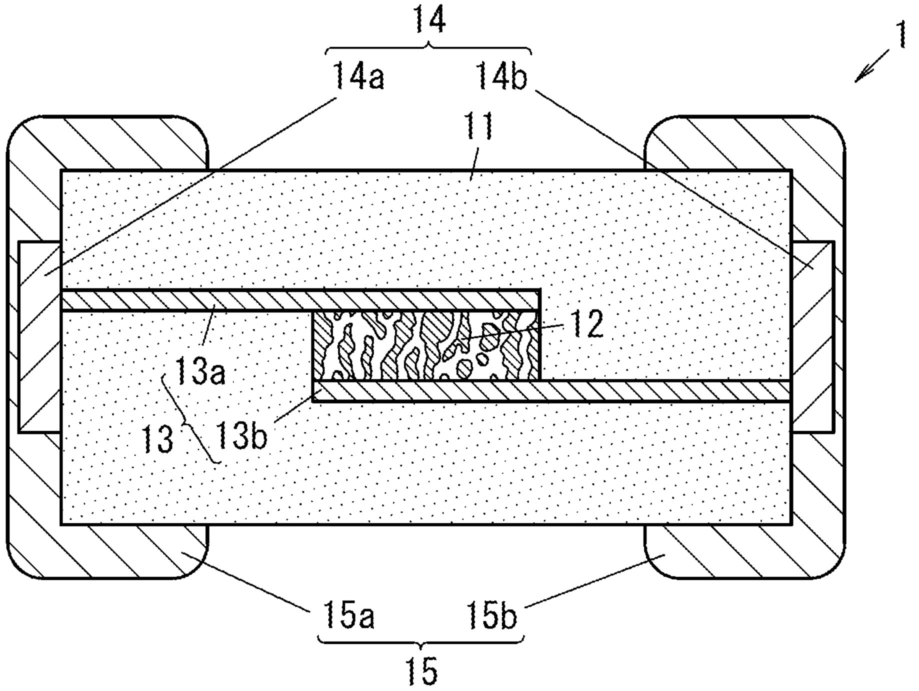
FIG. 4 is a sectional view of another surge-absorbing element of the embodiment of the present disclosure.

FIG. 4 is a sectional view of a surge-absorbing element 1 in another embodiment of the present disclosure. Outer peripheries of both end surfaces of an element body 11 are not covered with primary external electrodes 14 but are covered with secondary external electrodes 15. Bonding strength between the element body 11 and each of the secondary external electrodes 15 is lower than bonding strength between the element body 11 and each of the primary external electrodes 14. Thus, side surfaces of the element body 11 are not covered with the primary external electrodes 14 but are covered with the secondary external electrodes 15, and the bonding strength between the element body 11 and each of the secondary external electrodes 15 is preferably lower than the bonding strength between the element body 11 and each of the primary external electrodes 14. Thus, when internal stress and external stress act on the surge-absorbing element 1, peeling off occurring at an interface between the element body 11 and each of the secondary external electrodes 15 between which the bonding strength is low prevents open destruction. The bonding strength is evaluated based on a tensile test performed on a sample obtained by soldering lead wires to the primary external electrodes 14 and the secondary external electrodes 15 of the surge-absorbing element 1, or a sample obtained by applying a conductive paste for the primary external electrodes 14 or a conductive paste for the secondary external electrodes 15 to end surfaces of the element body 11 on which a conductive paste including glass and metal to the element body 11 has been applied and baked, baking or curing the conductive paste for the primary external electrodes 14 or for the secondary external electrodes 15 under the same condition as that when the electrodes are formed, and soldering lead wires. An area where the end surfaces of the element body 11 are directly bonded to the secondary external electrodes 15 increases, and thus, the internal stress can be more efficiently absorbed. Moreover, when the thickness of the functioning portion 12 is reduced and the suppressing effect is improved, a current at the time of ESD application increases, so that thermal expansion of the internal electrodes is more likely to occur. However, this configuration further increases the effect of suppressing the internal electrodes 13 from thermally deforming and thus provides an effect of maintaining insulation properties.

Figure 5:
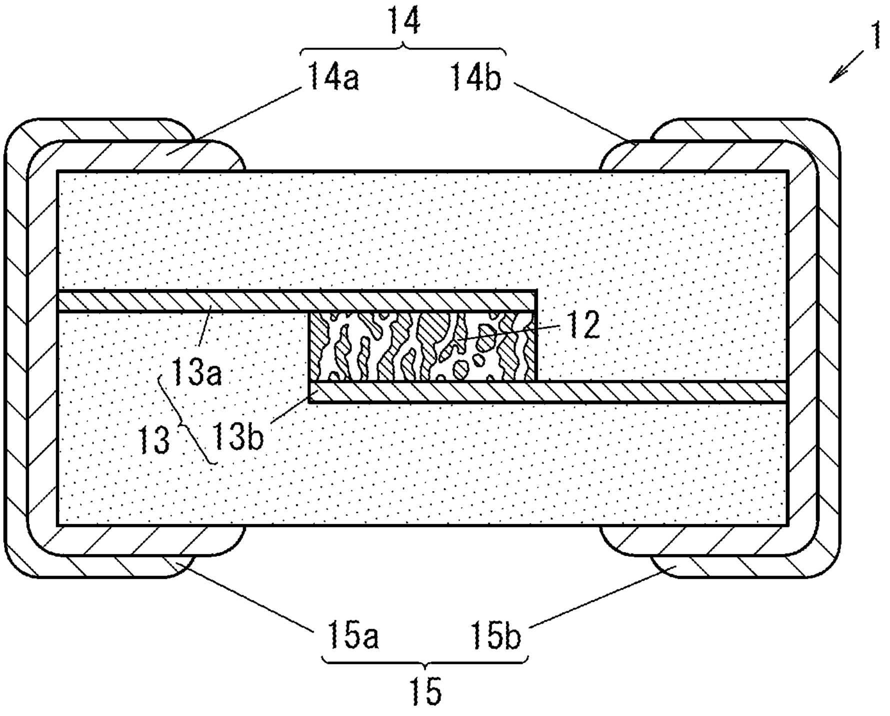
FIG. 5 is a sectional view of still another surge-absorbing element of the embodiment of the present disclosure.

FIG. 5 shows a sectional view of still another surge-absorbing element 1 of the present embodiment. Primary external electrodes 14 are electrically connected to internal electrodes 13 and secondary external electrodes 15 and have regions where the primary external electrodes 14 is partially not covered with the secondary external electrodes 15 at ends of the primary external electrodes 14. Thus, each of the primary external electrodes 14 may have a region not covered with the secondary external electrodes 15. Moreover, soldering is preferably performed on the regions, which are not covered with the secondary external electrodes 15, of the primary external electrodes 14. With this configuration, part of solder provided on a substrate is directly connected to the primary external electrodes 14 without intervention of the secondary external electrodes 15 including a resin component. Therefore, even when a large current of, for example, 30 A instantaneously flows, surge absorption becomes possible without the intervention of the secondary external electrodes 15 including the resin component, thereby preventing the external electrode portion from being burned out. Further, an electrode paste which will be the primary external electrodes 14 may be formed and then be fired at the same time as the element body 11. Sintering the primary external electrodes 14 and the internal electrodes 13 at the same time increases fixing strength, thereby providing the burnout preventing effect at the time of a large current inrush. Moreover, plating electrodes may be formed on the primary external electrodes 14 and the secondary external electrodes 15. Also in this case, an electrical connection without the intervention of the secondary external electrodes 15 including the resin component is possible, and a similar effect is obtainable.

Figure 6:
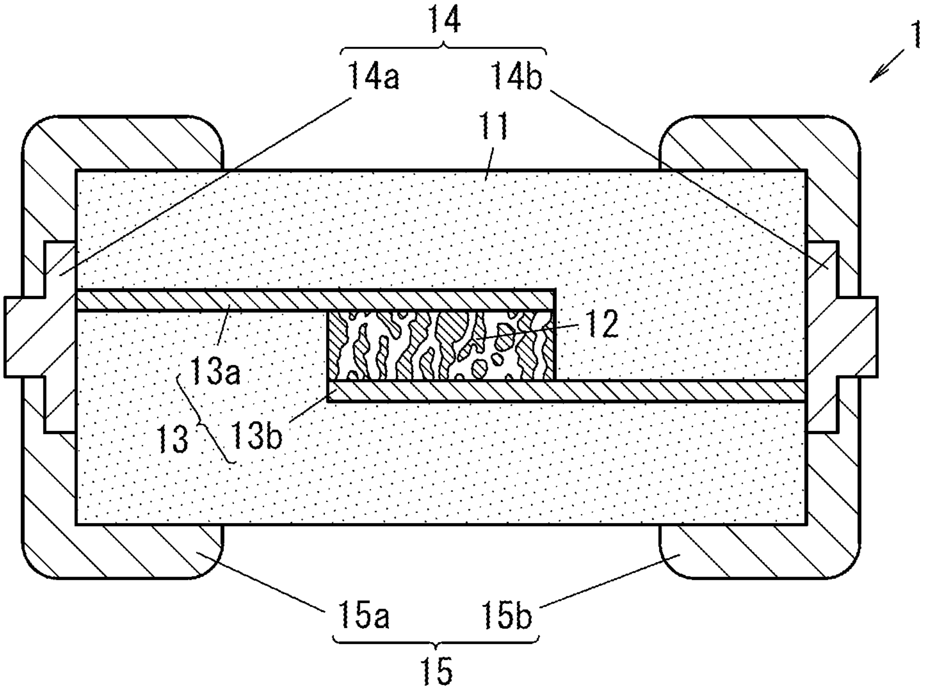
FIG. 6 is a sectional view of yet another surge-absorbing element of the embodiment of the present disclosure.

Further, as shown in FIG. 6, primary external electrodes 14 more desirably have regions where the primary external electrodes 14 are partially not covered with secondary external electrodes 15 and which are located at the end surfaces of an element body 11. This configuration can further reduce a path which does not pass the secondary external electrodes 15 including a resin component, thereby providing a further burnout preventing effect.

A method of manufacturing the surge-absorbing element of the present disclosure will be described.

First of all, ceramic powder which exhibits voltage nonlinearity characteristics, an organic binder, and a solvent, and more preferably also resin particles, are uniformly mixed together. A ceramic slurry or a ceramic paste is thus prepared. The composition of the ceramic powder employed in the present embodiment is 97.5 mol % ZnO as a main component and 2.5 mol % element(s), Sr, Ca, Co, Cr, Mn, Al, etc. which is a sub-component other than ZnO, thereby embodying a configuration having high discharge efficiency. The ceramic slurry or the ceramic paste may further contain, for example, a plasticizer. The resin particles are made of a macromolecular material which completes heat decomposition at about 600° C. or lower. A thermoplastic resin is preferably employed. The resin particles may have at least a spherical shape or an ellipsoidal shape or may have a true spherical shape. The spherical or ellipsoidal shape is, for example, a shape in which the ratio of the longest diameter to the shortest diameter is less than or equal to 1.25 for at least 95% of the number of particles. The present embodiment employs spherical acrylic resin particles, thereby obtaining the effect of improving dispersibility at the time of preparing the paste.

Subsequently, outer green sheets, and a conductive paste which will form conductive bases are prepared. Firing which will be described later makes the outer green sheets become the element body 11. The conductive bases become the internal electrodes 13. Further, a ceramic green body becomes a functioning portion 12. Each outer green sheet is a low-temperature co-fired ceramics (LTCC) sheet containing alumina particles and borosilicic acid glass and has a relative permittivity of about 10 after the firing. This configuration enables the stray capacitance of the surge-absorbing element 1 to be reduced. A mixture obtained by adding at least one of $La_2O_3$, $CeO_2$, $Pr_6O_{11}$, $Nd_2O_3$, $Sm_2O_3$, MgO, $SiO_2$, or $Gd_2O_3$ to the alumina particles and the borosilicic acid glass may be employed. The present embodiment employs LTCC obtained by adding MgO, $SiO_2$, and $Gd_2O_3$ to the alumina particles and the borosilicic acid glass. Thus, forming the element body 11 to include an element having a small work-function promotes an electrical discharge, thereby improving a protective effect.

Then, the conductive paste is applied onto one outer green sheet of the outer green sheets by, for example, screen printing and is then dried, thereby forming a conductive base which is a thin film having a prescribed shape. Firing which will be described later makes the conductive base become the internal electrode 13. The present embodiment employs an Ag—Pd alloy (Ag/Pd ratio: 70/30) as the internal electrodes 13, thereby enabling heat treatment to be performed in an atmosphere. Next, on the one outer green sheet and the conductive base, the ceramic green body and another one of the outer green sheets are formed. Thereafter, on the ceramic green body, another conductive base is formed of the conductive paste. Subsequently, the other outer green sheet is stacked on the another conductive base and the another outer green sheet, thereby obtaining a stack.

The ceramic green body contains a plurality of resin particles. The ceramic green body is formed on the conductive base by shaping the ceramic slurry by, for example, a doctor blade method reverse roll coater method, or by shaping the ceramic paste by, for example, screen printing gravure printing. Note that after the ceramic green body is formed on the one outer green sheet and the conductive base without employing the another outer green sheet, the another conductive base may be formed on the ceramic green body and the one outer green sheet. In this way, the ceramic green body and the conductive bases are integrally formed in contact with each other. The ceramic green body and the conductive bases form a varistor part by the firing.

Subsequently, the stack is subjected to heat treatment by increasing a temperature to a temperature at which the organic binder and the resin particles can be burned down, thereby decomposing removing the organic binder and the resin particles included in the ceramic green body to form the functioning portion 12 having voids. In the present embodiment, the firing is performed at 900° C. to 1000° C. Thus, including the plurality of resin particles in the ceramic slurry or the ceramic paste facilitates formation of a structure in which crystal particles, connected to each other, of the functioning portion 12 are bordering the voids. As a result, the suppressed voltage can be reduced. Moreover, employing the resin particles enables openings of the voids to be formed in a distributed manner at principal surfaces of internal electrodes in a gap region. This can reduce concentration of a current density in the internal electrodes due to ESD, prevent the internal electrodes from being burned out or worn due to an electrical discharge, and reduce the suppressed voltage. A volume ratio of the resin particles contained in the ceramic slurry or the ceramic paste to a sum of volumes of the ceramic powder and the resin particles is 70%. The volume ratio of the resin particles is preferably higher than or equal to 10% and lower than or equal to 80%, which can significantly reduce the suppressed voltage. Further, the average particle size of the resin particles is 1.8 μm, and the average particle size of the ceramic powder is 1.1 μm. The average particle size of the resin particles is preferably greater than the ceramic powder. This further facilitates formation of the structure in which the crystal particles, connected to each other, of the functioning portion 12 are bordering the voids, and the suppressed voltage can be reduced. Moreover, the average particle size of the resin particles is preferably less than or equal to the thickness of the functioning portion 12. In the present embodiment, the thickness of the functioning portion is about 6 μm. Here, the average particle size is the value of cumulative distribution 50% (D50) measured by using a particle size distribution measurement device. Thus, after the ceramic green body and the conductive bases which will be the internal electrodes are in contact with each other and are formed integrally with each other, the organic binder and the resin particles are made disappear, thereby forming the voids having a void ratio of about 85%. Thus, in response to application of the ESD across the internal electrodes 13, a surface discharge can be elicited at surfaces of the crystal particles bordering the voids provided in the functioning portion 12. Thus, the suppressed voltage can be significantly reduced.

Then, a paste containing conductive particles of Ag, Cu, etc. is applied to both end surfaces of the element body 11 and is then baked, thereby forming the primary external electrodes 14. In the present example, Ag is employed as the primary external electrodes 14. The internal electrodes 13 are Ag—Pd, and the primary external electrodes 14 are Ag, thereby relieving the internal stress. The elastic modulus of each of the primary external electrodes 14 thus obtained is about 83 GPa.

Moreover, a thermosetting conductive paste is applied to the primary external electrodes 14, thereby forming the secondary external electrodes 15. In the present example, a thermosetting resin is an epoxy resin, and a thermosetting conductive paste containing 60 wt. % Ag powder is employed. The Ag powder having a needle shape which has a major axis of 2 μm to 20 μm and a minor axis of 0.2 μm to 2 μm and which has major axis length/minor axis length of 5 to 75 is employed, which facilitates establishing electrical connection and thus improves the conductive property while the low elastic modulus is maintained without increasing the amount of Ag. To 200° C. which is a curing temperature, a temperature is increased at a temperature gradient of 7° C. to 60° C. per minutes to a maximum temperature, and then, the maximum temperature is kept for 10 minutes to 60 minutes, and the temperature is then lowered at a temperature gradient of 7° C. to 60° C. per minute to an ordinary temperature and is cooled, thereby forming the secondary external electrodes 15. Here, the resistivity is $4\times10^{-6}$ Ωcm, and the elastic modulus is about 8 GPa. Moreover, to prevent oxidation, a nitrogen gas, for example, may be caused to flow in, and baking may be performed at a low oxygen concentration ($<8.0\times10^{-1}$ ppm), thereby further reducing the resistance. Then, on the surfaces of the electrodes, a nickel layer and a tin layer may be sequentially formed by electroplating. The surge-absorbing element 1 is thus completed.

Summary

As can be seen from the embodiments described above, a surge-absorbing element (1) of a first aspect includes: an element body (11) having a pair of end surfaces opposite to each other and a plurality of side surfaces each adjacent to the pair of end surfaces; at least one pair of internal electrodes (13) disposed in the element body (11); and at least one pair of external electrodes disposed on the pair of end surfaces and electrically connected to the internal electrodes (13). The element body (11) includes a functioning portion (12) having voids and including polycrystal structures including a plurality of crystal particles which exhibit voltage non-linearity characteristics and an outer shell part covering the functioning portion (12). The internal electrodes (13) face each other via the functioning portion (12) disposed between the internal electrodes (13). The external electrodes include at least one pair of primary external electrodes (14) disposed on the end surfaces and at least one pair of secondary external electrodes (15) disposed on the primary external electrodes (14) and electrically connected to the primary external electrodes (14). Each of the secondary external electrodes (15) has an elastic modulus lower than an elastic modulus of each of the primary external electrodes (14).

The first aspect enables a good and stable ESD suppressing effect and tolerance against an abnormality voltage or a DC voltage to be provided.

In a surge-absorbing element (1) of a second aspect referring to the first aspect, the internal electrodes (13) are configured to, when a surge voltage is applied across the internal electrodes (13), be electrically connected to each other by eliciting a surface discharge at a surface where the plurality of crystal particles in the functioning portion (12) are bordering the voids.

The second aspect enables the ESD suppressing effect and the tolerance against an abnormality voltage or the like to be further improved.

In a surge-absorbing element (1) of a third aspect referring to the first or second aspect, the internal electrodes (13) and the primary external electrodes (14) include Ag.

The third aspect enables the electrodes to be prevented from oxidized at the time of ESD suppression and/or at the time of heat treatment and to have reduced resistance and thus enables the suppressing effect to be suppressed from decreasing even when the ESD is repeatedly applied.

In a surge-absorbing element (1) of a fourth aspect referring to any one of the first to third aspects, when the elastic modulus of each of the primary external electrodes (14) is denoted by $E_A$ and the elastic modulus of each of the secondary external electrode (15) is denoted by $E_B$, $3 \le E_A/E_B \le 2000$.

The fourth aspect enables the effect of stress relief to be further improved.

In a surge-absorbing element (1) of a fifth aspect referring to the fourth aspect, $10 \le E_A/E_B \le 2000$.

The fifth aspect enables the effect of the stress relief to be further improved.

In a surge-absorbing element (1) of a sixth aspect referring to any one of the first to fifth aspects, the functioning portion (12) has a void ratio of higher than or equal to 25% and lower than or equal to 92%.

The sixth aspect enables the suppressed voltage to be significantly low, and additionally, tolerance against static electricity to be increased.

In a surge-absorbing element (1) of a seventh aspect referring to any one of the first to sixth aspects, each of the internal electrodes (13) has a melting point lower than a melting point of each of the primary external electrodes (14).

According to the seventh aspect, internal stress at the time of a large current inrush is absorbed, via the internal electrodes (13), by the primary external electrodes (14) each having a low elastic modulus and then by the secondary external electrodes (15), thereby preventing damage to the element.

In a surge-absorbing element (1) of an eighth aspect referring to any one of the first to seventh aspects, each of the secondary external electrodes (15) has a thickness greater than a thickness of each of the primary external electrodes (14).

According to the eighth aspect, each of the secondary external electrodes (15) having a low elastic modulus has a greater thickness than each of the primary external electrode (14) having a high elastic modulus, thereby further improving the effect of the stress relief, and in addition, further improving the reliability.

In a surge-absorbing element (1) of the ninth aspect referring to any one of the first to eighth aspects, each of the primary external electrode (14) has a region which is not covered with a corresponding one of the secondary external electrodes (15).

According to the ninth aspect, part of solder provided on a substrate is directly connected to the primary external electrodes (14) without intervention of the secondary external electrodes (15) including a resin component. Therefore, even when a large current of, for example, 30 A instantaneously flows, surge absorption becomes possible without the intervention of the secondary external electrodes (15) including the resin component, thereby preventing the external electrode portion from being burned out.

In a surge-absorbing element (1) of a tenth aspect referring to the ninth aspect, each of the primary external electrodes (14) has a region which is not covered with a corresponding one of the secondary external electrodes (15) and which is located at a corresponding one of the end surfaces of the element body (11).

The tenth aspect enables a path not passing the secondary external electrodes (15) including the resin component to be further reduced, thereby providing a burnout preventing effect.

In a surge-absorbing element (1) of an eleventh aspect referring to any one of the first to tenth aspects, the side surfaces of the element body (11) are not covered with the primary external electrodes (14) but are covered with the secondary external electrodes (15), and bonding strength between the element body (11) and each of the secondary external electrodes (15) is smaller than bonding strength between the element body (11) and each of the primary external electrodes (14).

According to the eleventh aspect, when internal stress and external stress act on the surge-absorbing element (1), peeling off occurring at an interface between the element body (11) and each of the secondary external electrodes (15) between which the bonding strength is low prevents open destruction.

In a surge-absorbing element (1) of a twelfth aspect referring to any one of the first to eleventh aspects, the primary external electrodes (14) include no resin, and the secondary external electrodes (15) includes a resin.

The twelfth aspect enables the elastic moduli of the primary external electrodes (14) and the secondary external electrodes (15) to be more appropriately controlled.

In a surge-absorbing element (1) of a thirteenth aspect referring to any one of the first to twelfth aspects, the functioning portion (12) includes a main component different from a main component of the outer shell part.

The thirteenth aspect enables new effects, such as a fracture preventing effect, high surge effect, and the like to be exhibited.

In a surge-absorbing element (1) of a fourteenth aspect referring to any one of the first to thirteenth aspects, the functioning portion (12) includes ZnO as a main component, and the outer shell part includes glass ceramics as a main component.

The fourteenth aspect enables a high surge absorbing effect to be provided.

INDUSTRIAL APPLICABILITY

The surge-absorbing element 1 of the present disclosure provides a good and stable ESD suppressing effect and has tolerance against an abnormality voltage or a DC voltage and is thus industrially useful.

REFERENCE SIGNS LIST

11 Element Body
12 Functioning Portion
13 Internal Electrode
13*a* First Internal Electrode
13*b* Second Internal Electrode
14 Primary External Electrode
14*a* First Primary External Electrode
14*b* Second Primary External Electrode
15 Secondary External Electrode
15*a* First Secondary External Electrode
15*b* Second Secondary External Electrode

The invention claimed is:

1. A surge-absorbing element comprising:
an element body having
a pair of end surfaces opposite to each other and
a plurality of side surfaces each adjacent to the pair of end surfaces;
at least one pair of internal electrodes disposed in the element body; and
at least one pair of external electrodes each disposed on a corresponding one of the pair of end surfaces and electrically connected to a corresponding one of the internal electrodes,
the element body including
a functioning portion having voids and including polycrystal structures including a plurality of crystal particles which exhibit voltage non-linearity characteristics and
an outer shell part covering the functioning portion,
the internal electrodes facing each other via the functioning portion disposed between the internal electrodes,
the external electrodes including
at least one pair of primary external electrodes disposed on the end surfaces and
at least one pair of secondary external electrodes disposed on the primary external electrodes and electrically connected to the primary external electrodes,
each of the secondary external electrodes having an elastic modulus lower than an elastic modulus of each of the primary external electrodes.

2. The surge-absorbing element of claim 1, wherein
the internal electrodes are configured to, when a surge voltage is applied across the internal electrodes, be electrically connected to each other by eliciting a surface discharge at a surface where the plurality of crystal particles in the functioning portion are bordering the voids.

3. The surge-absorbing element of claim 1, wherein
the internal electrodes and the primary external electrodes include Ag.

4. The surge-absorbing element of claim 1, wherein
when the elastic modulus of each of the primary external electrode is denoted by $E_A$ and the elastic modulus of each of the secondary external electrodes is denoted by $E_B$, $3 \leq E_A/E_B \leq 2000$.

5. The surge-absorbing element of claim 4, wherein $10 \leq E_A/E_B \leq 2000$.

6. The surge-absorbing element of claim 1, wherein
the functioning portion has a void ratio of higher than or equal to 25% and lower than or equal to 92%.

7. The surge-absorbing element of claim 1, wherein
each of the internal electrodes has a melting point higher than a melting point of each of the primary external electrodes.

8. The surge-absorbing element of claim 1, wherein
each of the secondary external electrodes has a thickness greater than a thickness of each of the primary external electrode.

9. The surge-absorbing element of claim 1, wherein
each of the primary external electrodes has a region which is not covered with a corresponding one of the secondary external electrodes.

10. The surge-absorbing element of claim 9, wherein
each of the primary external electrodes has a region which is not covered with a corresponding one of the secondary external electrodes and which is located at a corresponding one of the end surfaces of the element body.

11. The surge-absorbing element of claim 1, wherein
the side surfaces of the element body are not covered with the primary external electrodes but are covered with the secondary external electrodes, and
bonding strength between the element body and each of the secondary external electrodes is smaller than bonding strength between the element body and each of the primary external electrodes.

12. The surge-absorbing element of claim 1, wherein
the primary external electrodes include no resin, and
the secondary external electrodes includes a resin.

13. The surge-absorbing element of claim 1, wherein
the functioning portion includes a main component which is different from a main component of the outer shell part.

14. The surge-absorbing element of claim 1, wherein
the functioning portion includes ZnO as a main component, and
the outer shell part includes glass ceramics as a main component.

* * * * *